United States Patent
Santos et al.

(10) Patent No.: US 12,024,671 B2
(45) Date of Patent: Jul. 2, 2024

(54) QUATERNARY AMMONIUM EMULSION BREAKERS

(71) Applicant: Halliburton Energy Services, Inc., Houston, TX (US)

(72) Inventors: Catherine Martin Santos, Houston, TX (US); Li Guo, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/086,856

(22) Filed: Dec. 22, 2022

(65) Prior Publication Data

US 2023/0127027 A1 Apr. 27, 2023

Related U.S. Application Data

(62) Division of application No. 16/476,222, filed as application No. PCT/US2019/040466 on Jul. 3, 2019, now Pat. No. 11,566,158.

(60) Provisional application No. 62/714,445, filed on Aug. 3, 2018.

(51) Int. Cl.
*C09K 8/28* (2006.01)
*B01D 17/02* (2006.01)
*B01D 17/04* (2006.01)

(52) U.S. Cl.
CPC ............ *C09K 8/28* (2013.01); *B01D 17/0217* (2013.01); *B01D 17/047* (2013.01); *C09K 2208/26* (2013.01)

(58) Field of Classification Search
CPC .. C09K 8/28; C09K 2208/26; B01D 17/0217; B01D 17/047
See application file for complete search history.

(56) References Cited

U.S. PATENT DOCUMENTS

| | | | | |
|---|---|---|---|---|
| 2,643,979 A | * | 6/1953 | Lindert | C10M 1/08 508/334 |
| 3,585,148 A | | 6/1971 | Sackis | |
| 3,594,314 A | * | 7/1971 | Bilhartz | C02F 1/36 210/708 |
| 4,277,352 A | * | 7/1981 | Allison | B01D 17/047 166/266 |
| 4,299,690 A | * | 11/1981 | Allan | B01D 17/047 516/146 |
| 5,154,857 A | * | 10/1992 | Durrieu | C10G 33/04 210/708 |
| 6,881,349 B2 | | 4/2005 | Mueller | |
| 2006/0237372 A1 | * | 10/2006 | Arciszewski | E21B 21/068 210/708 |

OTHER PUBLICATIONS

Office Action Summary for U.S. Appl. No. 16/476,222 dated Jan. 3, 2022.
Final Office Action Summary for U.S. Appl. No. 16/476,222 dated May 26, 2022.

* cited by examiner

*Primary Examiner* — Kumar R Bhushan
(74) *Attorney, Agent, or Firm* — Thomas Rooney; C. Tumey Law Group PLLC

(57) ABSTRACT

A method may include: performing a treatment operation on at least a portion of a subterranean formation using an oil-in-water emulsion treatment fluid that comprises an oleaginous phase and an aqueous phase; recovering at least a portion of the oil-in-water emulsion treatment fluid from the portion of the subterranean formation; introducing a quaternary ammonium compound into the recovered portion of the oil-in-water emulsion treatment fluid at a well site; and mechanically separating at least a portion of the recovered portion of the oil-in-water emulsion treatment fluid into an oleaginous fluid and an aqueous fluid.

12 Claims, 2 Drawing Sheets

QUATERNARY AMMONIUM EMULSION BREAKERS

CROSS-REFERENCE TO RELATED APPLICATION

The present application claims the benefit of U.S. Provisional Application No. 62/714,445 filed Aug. 3, 2018, which is incorporated herein by reference in its entirety for all purposes.

BACKGROUND

The present disclosure relates to systems and methods for use in subterranean formations. Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, cementing fluids, gravel pack fluids, acidizing fluids, fracturing fluids, spacer fluids, and the like.

During the drilling of a wellbore into a subterranean formation, a drilling fluid, also referred to as a drilling mud, may be continuously circulated from the surface down to the bottom of the wellbore being drilled and back to the surface again. Among other functions, the drilling fluid serves to transport wellbore cuttings up to the surface, cool the drill bit, and provide hydrostatic pressure on the walls of the drilled wellbore. Drilling fluids generally may be water-based or oil-based and synthetic-based fluids. One type of water-based fluid may be an oil-in-water emulsion that includes an aqueous continuous phase and an oleaginous discontinuous phase. To avoid the loss of the drilling fluid and allow its reuse, the cuttings may be separated from the drilling fluid at the surface. A variety of different solids separation equipment may be used at the well site, including shale shakers, demanders, desalter, mud cleaners, centrifuges, and the like. After removal of the drilling cuttings, the recovered drilling fluid may be reused in the wellbore, or the oil or water in the drilling fluid recycled for reuse, for example, in another treatment fluid.

BRIEF DESCRIPTION OF THE DRAWINGS

These drawings illustrate certain aspects of some of the embodiments of the present disclosure, and should not be used to limit or define the claims.

Figure 1:
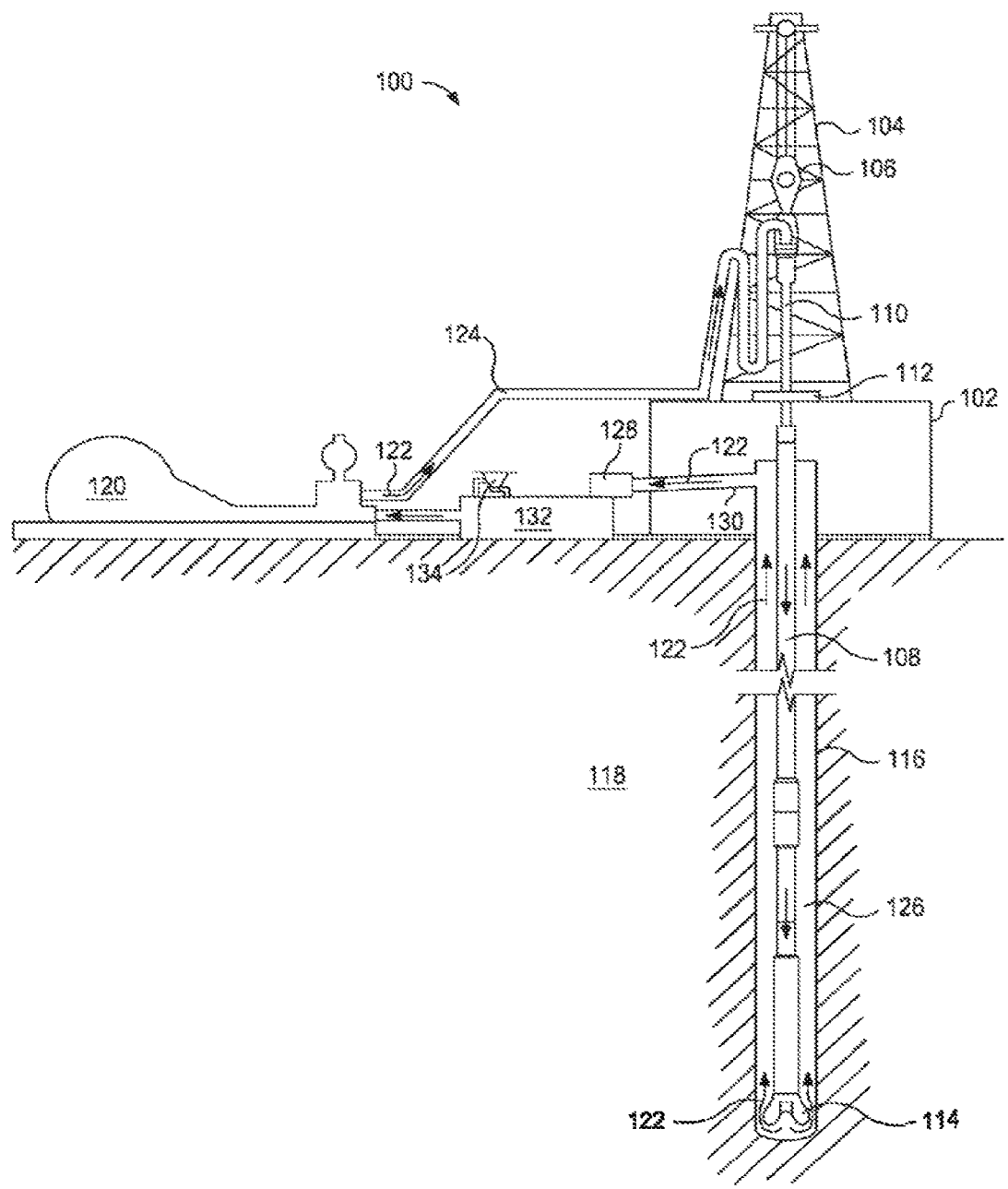
FIG. 1 is a diagram illustrating an example of a drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

As used herein, a "hydrocarbon chain" may, unless otherwise specifically noted, be branched, unbranched, non-cyclic, and/or cyclic; it may be substituted or unsubstituted (that is, it may or may not contain one or more additional moieties or functional groups in place of one or more hydrogen atoms in the hydrocarbon chain); and/or it may be saturated or unsaturated. Furthermore, as used herein, the nomenclature "$C_x$ to $C_y$" refers to the number of carbon atoms in the hydrocarbon chain (here, ranging from x to y carbon atoms). As used herein. "independently" refers to the notion that the preceding items may be the same or different.

The present disclosure relates to systems and methods for use in subterranean formations. Particularly, the present disclosure relates to compositions and methods for the use of quaternary ammonium compounds to break oil-in-water emulsion treatment fluids.

In some embodiments, the present disclosure may include a method including introducing a quaternary ammonium compound into an oil-in-water emulsion treatment fluid that comprises an oleaginous phase and an aqueous phase and centrifuging at least the portion of the oil-in-water emulsion treatment fluid to separate at least a portion of the oil-in-water emulsion treatment fluid into an oleaginous fluid and an aqueous fluid. In certain embodiments, the methods of the present disclosure may include performing a treatment operation on at least a portion of a subterranean formation using an oil-in-water emulsion treatment fluid that comprises an oleaginous phase and an aqueous phase; recovering a least a portion of the oil-in-water emulsion treatment fluid from the portion of the subterranean formation; introducing a quaternary ammonium compound into the recovered portion of the oil-in-water emulsion treatment fluid at a well site; and mechanically separating at least a portion of the recovered portion of the oil-in-water emulsion treatment fluid into an oleaginous fluid and an aqueous fluid.

In some embodiments, the methods of the present disclosure may include introducing a quaternary ammonium compound into an oil-in-water emulsion treatment fluid; introducing a brine into the oil-in-water emulsion treatment fluid; heating the oil-in-water emulsion treatment fluid to at least 80° F.; and mechanically separating at least a portion of the oil-in-water emulsion-treatment fluid into an oleaginous fluid and an aqueous fluid.

Among the many potential advantages to the methods and compositions of the present disclosure, only some of which are alluded to herein, the methods, compositions, and systems of the present disclosure may provide improved and more effective means to break oil-in-water emulsion fluids. In certain embodiments, the methods, compositions, and systems of the present disclosure may reduce the volume of waste at a job site. In some embodiments, this may, among other benefits, reduce the costs associated with transporting untreated fluids off-site for treatment and/or disposal. In some embodiments, the methods and systems of the present disclosure also may increase the amount of aqueous or non-aqueous fluids available for reuse in subsequent subterranean operations. In some embodiments, this may, among other benefits, reduce the amounts and/or concentrations of contaminants in fluids sufficiently to re-use the fluids in subsequent operations (e.g., fracturing operations, drilling operations, etc.) at the same well site or job site where it was recovered or at another site. In some embodiments, this may reduce or eliminate the cost associated with transporting fluids to the well site or job site for such operations.

In certain embodiments, the quaternary ammonium compound may be introduced into an oil-in-water emulsion treatment fluid. In some embodiments, the quaternary ammonium compound and the oil-in-water emulsion treatment fluid are mixed to allow the oil-in-water emulsion treatment fluid to at least partially separate before centrifuging and/or another mechanical treatment is applied to the fluid. In certain embodiments, the quaternary ammonium compound may be a fatty alkyl quaternary ammonium compound. In certain embodiments, the quaternary ammonium compound may be substantially of the formula $R^1R^2R_3R^4N^+$.

In some embodiments, each of $R^1$, $R^2$, and $R^3$ may independently be a $C_1$ to $C_{10}$ hydrocarbyl group. In some embodiments, at least one of $R^1$, $R^2$, and $R_3$ may include a $C_1$ to $C_{10}$ hydrocarbon chain. The hydrocarbon chain may include any one or more hydrocarbon groups selected from the group consisting of: alkyl, alkenyl, alkynyl, aryl, arylalkyl, arylalkenyl, alkylaryl, alkenylaryl, and any combination thereof, for example. In certain embodiments, any one or more of $R^1$, $R^2$, and $R^1$ may be branched, unbranched, non-cyclic, cyclic, saturated, and/or unsaturated. In certain embodiments, each of $R^1$, $R^2$, and $R^1$ may independently include (i) as few as any one of: 1, 2, 3, 4, 5, 6, 7, 8, 9, and 10 carbon atoms, and (ii) as many as one of: 2, 3, 4, 5, 6, 7, 8, 9, and 10 carbon atoms. For example, suitable ranges of numbers of carbon atoms in each of $R^1$, $R^2$, and $R^3$ according to various embodiments include, but are not limited to 1 to 2, 1 to 3, 1 to 4, 1 to 5, 1 to 6, 1 to 7, 1 to 8, 1 to 9, 1 to 10, 2 to 4, 3 to 5, 4 to 6, 5 to 7, 6 to 8, 7 to 9, 8 to 10, and the like.

In some embodiments, any one or more of $R^1$, $R^2$, and $R^3$ may include a $C_1$ to $C_{10}$ alkyl chain. In some embodiments, any one or more of $R^1$, $R^2$, and $R^3$ may include a $C_2$ to $C_6$ alkenyl or alkynyl chain. In some embodiments, any one or more of $R^1$, $R^2$, and $R^3$ may include a $C_3$ to $C_6$ cyclic moiety. In certain embodiments, any one or more of $R^1$, $R^2$, and $R^3$ may be substituted (e.g., it may include any one or more functional groups in addition to the hydrocarbon groups described above). In certain embodiments, at least one of $R^1$, $R^2$, and $R^3$ may include a heteroatom (e.g., may include O, N, P, S, or another atom other than C or H).

In certain embodiments, $R^4$ may include a hydrocarbon chain, for example, a fatty alkyl chain. Examples of hydrocarbon chains suitable for certain embodiments of the present disclosure include, but are not limited to alkyl chains in the range of from about 1 to about 18 carbon atoms, from about 8 to about 18 carbon atoms, from about 12 to about 16 carbon atoms, or from about 12 to about 14 carbon atoms. In some embodiments, $R^4$ may include a hydrophilic moiety. In certain embodiments, $R^4$ includes a hydrocarbon chain and a hydrophilic moiety. Examples of hydrophilic moieties suitable for certain embodiments of the present disclosure include, but are not limited to a carboxylic acid, an ester, a glycol, an ethylene glycol, an ether, an amine, a sulfonamide, an amide, a ketone, a carbonyl, an isocyanate, a urea, a urethane, any derivative of the foregoing, and any combination thereof. In some embodiments, the quaternary ammonium compound includes a fatty carboxylic acid chain.

In certain embodiments, the quaternary ammonium compound may include and/or be bonded to a polymer moiety. In some embodiments, the quaternary ammonium compounds may include water-soluble cationic copolymers including a quaternary moiety. In some embodiments, the quaternary ammonium compounds may be derived from acrylamide and a quaternary compound of diallylamine. In certain embodiments, the quaternary ammonium compound may include an ethylene oxide quaternary copolymer. In some embodiments, the quaternary ammonium compound may be a non-polymeric compound and/or may not include a polymeric moiety. In some embodiments, the quaternary ammonium compound may be substantially free, or entirely free, of polymers.

In certain embodiments, the quaternary ammonium compound may be tethered (e.g., bonded or attached) to a nanoparticle. Nanoparticles suitable for certain embodiments of the present disclosure include, but are not limited to silver nanoparticles, gold nanoparticles, copper nanoparticles, and any combination thereof. In certain embodiments, the nanoparticles may include particles having a diameter of 100 nm or smaller, 10 nm or smaller, or 1 nm or smaller. In some embodiments, the nanoparticles may include particles having a diameter of from about 0.1 nm to about 100 nm. In certain embodiments, the nanoparticles may exhibit a particle size distribution between about 0.1 nm and about 100 nm. For example, in some embodiments, the plurality of nanoparticles may have a d50 particle size distribution of from about 0.1 nm to about 100 nm. In certain embodiments, the plurality of nanoparticles may exhibit a d50 particle size distribution of 100 nm or smaller, 10 nm or smaller, or 1 nm or smaller.

In certain embodiments, one or more quaternary ammonium compounds may be introduced into and/or be present in an oil-in-water emulsion treatment fluid in an amount within a range of from about 0.1% to about 10% based on the volume of the oil-in-water emulsion treatment fluid. In some embodiments, an effective amount of one or more quaternary ammonium compounds for breaking and/or separating the oil-in-water emulsion treatment fluid may be as low as any of: 0.1, 0.5, 1, 1.5, 2, 2.5, 3, 3.5, 4, 4.5, 5, 5.5, 6, 6.5, and 7%, based on the volume of the oil-in-water emulsion treatment fluid, in certain embodiments, an effective amount of one or more quaternary ammonium compounds for breaking and/or separating the oil-in-water emulsion treatment fluid may be as high as any of: 3.5, 4, 4.5, 5, 5.5, 6, 6.5, 7, 7.5, 8, 8.5, 9, 9.5, and 10%, based on the volume of the oil-in-water emulsion treatment fluid. Thus, in some embodiments, an effective amount of quaternary ammonium compounds may be within a range of from about 1% to about 5% based on the volume of the oil-in-water emulsion treatment fluid; from about 0.1% to about 5% based on the volume of the oil-in-water emulsion treatment fluid; from about 0.1% to about 10% based on the volume of the oil-in-water emulsion treatment fluid; or from about 0.5% to about 10% based on the volume of the oil-in-water emulsion treatment fluid. It further will be appreciated by one of ordinary skill in the art having the benefit of the present disclosure that the amount of the quaternary ammonium compound effective tor breaking and/or separating the oil-in-water emulsion treatment fluid may depend upon, for example, the temperature, pressure, fluid composition, other additives in the fluid, and other conditions.

In certain embodiments, the quaternary ammonium compounds may act as demulsifiers to break oil-in-water emulsion drilling fluids. In some embodiments, at least 50% of the treatment fluid by volume may include the oil-in-water emulsion. The oil-in-water emulsion treatment fluid may include an aqueous phase and an oleaginous phase. In certain embodiments, the aqueous phase may include fresh water, seawater, or a brine. Examples of oils suitable for certain embodiments of the oleaginous phase of the present disclosure include, but are not limited to diesel oil, diesel-like oils, mineral oils, unsaturated olefins, organic esters, and any combination thereof. The oil-in-water emulsion of the present disclosure may include oil in any suitable proportion of the emulsion as will be appreciated by one of skill in the art with the benefit of this disclosure. In certain embodiments, the oil may be present in the emulsion in an amount from about 0.01% to about 50% by volume of the emulsion. In other embodiments, the oil may be present in the emulsion in an amount from about 10% to about 40% by volume of the emulsion.

In other embodiments, the oil may be present in the emulsion in an amount from about 20% to about 30% by volume of the emulsion.

In certain embodiments, the quaternary ammonium compounds of the present disclosure may be provided, used, and/or introduced as a salt of one or more of the compounds described herein. In such embodiments, the salt may include one or more counter anions. For example, the quaternary ammonium compound discussed herein may be present as a salt with a counter anion. In certain embodiments, such salts may wholly or partially dissociate in aqueous solution. In other embodiments, the salts may remain substantially associated (either with the original anion or with other ions from solution). Counter anions suitable for certain embodiments of the present disclosure include, but are not limited to a carboxylate, a halide, a sulfate, a nitrate, an organic sulfonate, a hydroxide, and/or any combination thereof. It will be appreciated by one of ordinary skill in the art having the benefit of this disclosure that salts may be formed with other counter anions instead of or in addition to the counter anions specifically disclosed herein. In some embodiments, the anion of the salt may be selected based, at least in part, on the cost and/or availability of anions.

In some embodiments, the quaternary ammonium compound may be introduced along with a solvent (along with other optional components). In certain embodiments, the quaternary ammonium compound may be mixed with a solvent prior to introduction into the oil-in-water emulsion treatment fluid. In certain embodiments, the solvent may include one or more organic solvents. Examples of solvents suitable for certain embodiments of the present disclosure include, but are not limited to an alcohol, methanol, ethanol, isopropyl alcohol, glycol, a glycol ether, any organic solvent, toluene, xylene, monobutyl ether, hexane, cyclohexane, and/or any combination thereof. In certain embodiments, the quaternary ammonium compound is added to a fluid as an emulsion breaker additive that includes the quaternary ammonium compound and a solvent. In some embodiments, the emulsion breaker additives may include NO BLOK® C, a quaternary ammonium compound and an isopropyl alcohol solvent, available from Halliburton Energy Services, Inc.

In some embodiments, the methods of the present disclosure may include introducing a brine into the oil-in-water emulsion treatment fluid. In certain embodiments, the brine may dilute the oil-in-water emulsion treatment fluid. The brine may be co-introduced with the quaternary ammonium compound or introduced separately. In certain embodiments, the brine may include an aqueous saturated salt solution. In certain embodiments, the brine may be any monovalent brine. In certain embodiments, the brine may be a saturated monovalent salt brine. For example, in some embodiments, the brine may be a saturated sodium brine. In some embodiments, the brine and quaternary ammonium compound may be mixed together to form an additive solution including the quaternary ammonium compound, and the additive solution may be introduced into the oil-in-water emulsion treatment fluid.

In certain embodiments, the quaternary ammonium compounds of the present disclosure may provide effective emulsion breaking for oil-in-water emulsion treatment fluids with an aqueous phase having a pH1 in a range of from about 5 to about 12, from about 6 to about 12, or from about 6 to about 10.

Some embodiments of the present disclosure may include a treatment system for performing the system and methods of the present disclosure. In some embodiments, the treatment system may include one or more chemical and/or mechanical treatment subsystems, which may include any vessels (e.g., tanks), conduits, or other devices suitable for conducting those treatments, and may be of any suitable shape and size for holding and/or treating treatment fluids. In some embodiments, the treatment systems of the present disclosure may be located, and the treatment methods may be performed, on an offshore rig or ship that is engaged in offshore subterranean operations, such as a drilling rig or drill ship. In other embodiments, the treatment systems may be located, and the treatment methods may be performed, at a land-based job site. The various components of the treatment systems discussed herein, as well as any other components of those systems, may be housed together in a single unit, or may be provided as one or more separate modules or tanks that may be connected and/or otherwise used together to perform different portions of the treatment process.

In some embodiments, the vessels in these subsystems may include a tank. The tank may include one or more inlets through which treatment fluids may flow into the tank, and one or more outlets through which fluids may be released. Any suitable valves, pumps, or other devices may be used for controlling the flow of water through the inlets and/or outlets of the tank. In some embodiments, the tank may be equipped with one or more agitation devices such as rotary stirring rods, paddles, blades, air nozzles, etc. that are configured to stir, mix, and/or agitate the contents of the tank and, in some embodiments, promote the breaking of oil-in-water emulsion treatment fluids in the tank.

In some embodiments, these vessels and/or conduits also may be equipped with arrays of sensors for detecting various types of phenomena (e.g., condition of certain equipment therein, flow of fluids, etc.) or properties of a fluid in the vessel and/or conduit. In some embodiments, the chemical treatment subsystems may include one or more additive storage containers and/or hoppers for holding and/or dispensing chemical additives into the wastewater in the vessel or conduit of that subsystem, or other actuatable components such as pumps, agitators, skimmers, filters, centrifuges, heaters, settlers, electrical current generators, and the like. For example, a quaternary ammonium compound and/or emulsion breaker additive of the present disclosure may be dispensed from a chemical treatment subsystem that includes one or more chemical additive hoppers configured to dispense chemical additives into chemical treatment tanks. In some embodiments, the chemical additive containers, hoppers and/or other actuatable components may be communicatively coupled to an information handling system and actuated or otherwise controlled by signals received from the information handling system without the need for human intervention or action directed to that action.

The quaternary ammonium compound and treatment fluid may be mixed using any suitable method and/or equipment known in the art. For example, the chemical treatment subsystem may include one or more chemical treatment tanks, each of which may equipped with agitation devices (e.g., rotary stirring rods, paddles, blades, air nozzles, etc.). Each chemical treatment subsystem may also include equipment such as heaters, coolant systems, and the like that may be used to control various conditions in the treatment tanks.

The mechanical treatments used in the methods and systems may include any flow shearing techniques known in the art for separating oil and water emulsions recovered at a well site or job site. Examples of such techniques that may be suitable for certain embodiments of the present disclosure include, but are not limited to, rotating conveyance augers, pipe flow regimes, centrifuges, centrifugal spin out platforms, counterflow conveyers, skimmer arms, paddles mixers, filters, and any combinations thereof.

The mechanical treatments used in the methods and systems may include any additional techniques known in the art for separating oil-in-water emulsions recovered at a well site or job site. Examples of such techniques that may be suitable for certain embodiments of the present disclosure include, but are not limited to, dissolved air flotation, skimming, filtration, reverse osmosis, settling, electric field application, electrocoagulation, and any combinations thereof. For example, some embodiments of the present disclosure may include filtering undissolved solids and/or particulates from the treatment fluid. In some embodiments, the mechanical treatments may involve performing certain actions with the treatment fluid at one or more different parameters, all of which may be varied in different mechanical treatments. Examples of parameters suitable for certain embodiments of the present disclosure include, but are not limited to, temperature, pressure, electric field strength, flow rate, centrifuge speed, residence time (e.g., time that the treatment fluid is subjected to the mechanical treatment), filter material and/or pore size, and any combination thereof.

In some embodiments, the quaternary ammonium compounds may be used in combination with mechanical means to separate or break the oil-in-water emulsion drilling fluid for recovery of the oleaginous and/or aqueous phase. The mechanical separation may occur downhole, on the surface, or any combination thereof. In some embodiments, at least a portion of the mechanical separation or breaking may be performed using a centrifuge to separate at least a portion of the oil-in-water emulsion treatment fluid into an oleaginous fluid and an aqueous fluid. In some embodiments, the mechanical separation may include centrifuging the oil-in-water emulsion treatment fluid at a relative centrifugal force ("rcf" or "×g") of from about 100 to about 3,000×g, from about 300 to about 2,000×g, from about 500 to about 2,000×g, or from about 1,000 to about 2,000×g. In certain embodiments, the mechanical separation may include centrifuging the oil-in-water emulsion treatment fluid at a relative centrifugal force of at least 500× g, at least 700× g, at least 1,000×g, or at least 1,500× g. In certain embodiments, the mechanical separation may include centrifuging the oil-in-water emulsion treatment fluid for a period of time of from about 1 to about 30 minutes, from about 1 to about 20 minutes, from about 1 to about 10 minutes, or from about 3 to about 8 minutes. In some embodiments, the mechanical separation may include centrifuging the oil-in-water emulsion treatment fluids for at least 2 minutes, at least 3 minutes, or at least 4 minutes.

In some embodiments, the methods of the present disclosure optionally may include heating the quaternary ammonium compound and/or treatment fluid before, during, or after the addition of the quaternary ammonium compound and the breaking of the emulsion of the treatment fluid. For example, in certain embodiments, the treatment fluid may be heated to a temperature in the range of from about 60° F. to about 150° F., from about 80° F. to about 150° F., or from about 120° F. to about 150° F. In some embodiments, the treatment fluid may be heated to at least 80° F., at least 120° F., or at least 150° F. In certain embodiments, heating the oil-in-water emulsion treatment fluid may increase the speed and/or the effectiveness of the emulsion breaking and separation.

In some embodiments, at least a portion of the oil-in-water emulsion treatment fluid may be separated into an oleaginous fluid and an aqueous fluid. In certain embodiments, the oleaginous fluid and/or aqueous fluid separated from the oil-in-water emulsion treatment fluid may be placed in a container for disposal, storage, or transport. In some embodiment, the oleaginous fluid and/or aqueous fluid separated from the oil-in-water emulsion treatment fluid may be reused (e.g., to create new drilling muds, roads construction material, other treatment fluids, or products), further treated, discharged, and/or reused in subsequent operations (e.g., further subterranean operations at the same job site from which the wastewater was recovered). In some embodiments, at least a portion of the separated oleaginous fluid and/or aqueous fluid may be combined with other components to form a recycled treatment fluid. In certain embodiments, the recycled treatment fluid may include a water-based mud. For example, in certain embodiments, the separated oleaginous fluid and/or aqueous fluid may be mixed with one or more additional components in a mud pit and then pumped out into a drill string or coiled tubing that is used to drill at least a portion of a wellbore penetrating a subterranean formation (e.g., the same subterranean formation from which the oil-in-water emulsion was recovered). In some embodiments, the recycled treatment fluid may be used to perform a treatment operation on a subterranean formation.

For example, in some embodiments, the recovered aqueous fluid and/or oleaginous fluid may be pumped into a mud pit where drilling fluids are prepared and/or held prior to use. The recovered aqueous fluid and/or oleaginous fluid may be mixed with one or more additional components in the mud pit and then pumped out into a drill string or coiled tubing that is used to drill at least a portion of a well bore penetrating a subterranean formation (e.g., the same subterranean formation from which the oil-in-water emulsion treatment fluid was recovered). In certain embodiments, the recovered aqueous fluid may be transferred from a tank to another treatment vessel such as a reverse osmosis unit, for among other reasons, to remove any remaining oil, or to remove salts and/or other species dissolved in the water, after which the remaining fresh water may be discharged and/or reused in subsequent operations.

In some embodiments, the methods and compositions of the present disclosure may result in greater recovery of the oleaginous phase of the oil-in-water emulsion treatment fluid than separation methods performed without the methods and compositions of the present disclosure. In certain embodiments, the methods and compositions of the present disclosure provide for recovery of the oleaginous phase in an amount in the range of from about 20% to about 100%, from about 30% to about 90%, from about 40% to about 80%, from about 50% to about 80% by volume of the oleaginous phase of the oil-in-water emulsion treatment fluid. In certain embodiments, the methods and compositions of the present disclosure provide for the recovery of at least 40%, at least 50%, or at least 60% of the oleaginous phase of the oil-in-water emulsion treatment fluid by volume.

In certain embodiments, the oil-in-water emulsion treatment fluids to be separated and/or broken may be recovered from the subterranean formation in conjunction with any type of subterranean operation or treatment, including but not limited to hydraulic fracturing treatments, acidizing treatments, and drilling operations. For example, in certain embodiments, a drilling fluid may be introduced into a subterranean formation while drilling at least a portion of a well bore that penetrates a subterranean formation, and the drilling fluid may serve a number of purposes, including but not limited to suspending and circulating drill cuttings out of the wellbore, cooling and/or lubricating a drill bit, and the like. The recovered drilling fluid or a portion thereof then may be circulated out of the wellbore during or after its use.

In certain embodiments, the fluids of the present disclosure may be formed at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of at least one other component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The fluids used in the methods and systems of the present disclosure may include any base fluid known in the art, including aqueous base fluids, non-aqueous base fluids, and any combinations thereof. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In some embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of die aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to oils, hydrocarbons, organic liquids, and the like.

In certain embodiments, the fluids used in the methods and systems of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion Inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The present disclosure, in some embodiments, provides methods for using the fluids to carry out a variety of subterranean treatments, including but not limited to hydraulic fracturing treatments, acidizing treatments, and drilling operations. In some embodiments, the fluids of the present disclosure may be used in treating a portion of a subterranean formation, for example, in acidizing treatments such as matrix acidizing or fracture acidizing. In certain embodiments, a fluid may be introduced into a subterranean formation. In some embodiments, the fluid may be introduced into a wellbore that penetrates a subterranean formation. In some embodiments, the fluid may be introduced at a pressure sufficient to create or enhance one or more fractures within the subterranean formation (e.g., hydraulic fracturing). The compositions of the present disclosure may be prepared using any suitable method and/or equipment (e.g., blenders, mixers, stirrers, etc.) known in the art at any time prior to their use. The compositions may be prepared at a well site or at an offsite location.

The methods and compositions of the present disclosure may be used during or in conjunction with any subterranean operation. For example, the methods and/or compositions of the present disclosure may be used in the course of a fracturing treatment. Other suitable subterranean operations in which the methods and/or compositions of the present disclosure may be used include, but are not limited to acidizing treatments (e.g., matrix acidizing and/or fracture acidizing), hydrajetting treatments, sand control treatments (e.g., gravel packing), "frac-pack" treatments, fracturing fluids, and other operations where emulsion breaking may be useful.

The methods and compositions of the present disclosure may also directly or indirectly affect the various downhole or subterranean equipment and tools that can come into contact with the compositions of the present disclosure during operation. Such equipment and tools can include wellbore easing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above.

Some embodiments of the present disclosure provide methods for using the disclosed compositions and treatment fluids to carry out a variety of subterranean treatments, including but not limited to, drilling. The drilling fluids disclosed herein may directly or indirectly affect one or more components or pieces of equipment associated with the preparation, delivery, recapture, recycling, reuse, and/or disposal of the drilling fluids. For example, and with reference to FIG. 1, the drilling fluids disclosed herein may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling fluid 122 prepared with the compositions disclosed herein through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The quaternary ammonium compounds used in the methods and compositions of the present disclosure may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the quaternary ammonium compounds used in the methods and compositions of the present disclosure may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the quaternary ammonium compounds used in the methods and compositions of the present disclosure thereof may be stored, reconditioned, and/or regulated until added to the drilling fluid 122.

As mentioned above, the drilling fluid 122 prepared with a composition disclosed herein may directly or indirectly affect the components and equipment of the drilling assembly 100. For example, the disclosed drilling fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the drilling fluid 122.

The drilling fluid 122 prepared as disclosed herein may directly or indirectly affect the pump 120, which representatively includes any conduits, pipelines, trucks, tubulars, and/or pipes used to fluidically convey the drilling fluid 122 downhole, any pumps, compressors, or motors (e.g., topside or downhole) used to drive the drilling fluid 122 into motion, any valves or related joints used to regulate the pressure or flow rate of the drilling fluid 122, and any sensors (i.e., pressure, temperature, flow rate, etc.), gauges, and/or combinations thereof, and the like. The disclosed drilling fluid 122 may also directly or indirectly affect the mixing hopper 134 and the retention pit 132 and their assorted variations.

An embodiment of the present disclosure is a method including introducing a quaternary ammonium compound into an oil-in-water emulsion treatment fluid that includes an oleaginous phase and an aqueous phase; and centrifuging at least the portion of the oil-in-water emulsion treatment fluid to separate at least a portion of the oil-in-water emulsion treatment fluid into an oleaginous fluid and an aqueous fluid.

In one or more embodiments described above, the quaternary ammonium compound is non-polymeric. In one or more embodiments described above, the oil-in-water emulsion treatment fluid is a water-based mud. In one or more embodiments described above, the method further includes forming a recycled treatment fluid including at least a portion of the oleaginous fluid or the aqueous fluid or both. In one or more embodiments described above, the method further includes using the recycled treatment fluid to perform a treatment operation in at least a portion of a subterranean formation. In one or more embodiments described above, the quaternary ammonium compound includes a fatty carboxylic acid chain. In one or more embodiments described above, the quaternary ammonium compound is mixed with a solvent prior to introduction into the oil-in-water emulsion treatment fluid. In one or more embodiments described above, the method further includes, before the step of centrifuging, mixing the quaternary ammonium compound and the oil-in-water emulsion treatment fluid to allow the oil-in-water emulsion treatment fluid to at least partially separate. In one or more embodiments described above, the oleaginous fluid includes at least 40% of the oleaginous phase of the oil-in-water emulsion treatment fluid by volume.

In another embodiment, the present disclosure provides a method including performing a treatment operation on at least a portion of a subterranean formation using an oil-in-water emulsion treatment fluid that includes an oleaginous phase and an aqueous phase: recovering a least a portion of the oil-in-water emulsion treatment fluid from the portion of the subterranean formation; introducing a quaternary ammonium compound into the recovered portion of the oil-in-water emulsion treatment fluid at a well site; and mechanically separating at least a portion of the recovered portion of the oil-in-water emulsion treatment fluid into an oleaginous fluid and an aqueous fluid.

In one or more embodiments described above, the mechanical separation is performed using a centrifuge. In one or more embodiments described above, the method further includes forming a recycled treatment fluid including at least a portion of the oleaginous fluid or the aqueous fluid. In one or more embodiments described above, the method further includes using the recycled treatment fluid to perform a treatment operation in at least a portion of a subterranean formation. In one or more embodiments described above, the quaternary ammonium compound includes a fatty carboxylic acid chain. In one or more embodiments described above, the quaternary ammonium compound is mixed with a solvent prior to introduction into the oil-in-water emulsion treatment fluid. In one or more embodiments described above, the oleaginous fluid includes at least 40% of the oleaginous phase of the oil-in-water emulsion treatment fluid by volume. In one or more embodiments described above, the mechanical separation is performed at the well site.

In another embodiment, the present disclosure provides a method introducing a quaternary ammonium compound into an oil-in-water emulsion treatment fluid; introducing a brine into the oil-in-water emulsion treatment fluid; heating the oil-in-water emulsion treatment fluid to at least 80° F.; and mechanically separating at least a portion of the oil-in-water emulsion treatment fluid into an oleaginous fluid and an aqueous fluid.

In one or more embodiments described above, the brine is a saturated monovalent brine. In one or more embodiments described above, the quaternary ammonium compound is mixed with a solvent prior to introduction into the oil-in-water emulsion treatment fluid.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

The following examples test the effectiveness of a series of emulsion breaking methods and compositions.

Example 1

Figure 2:
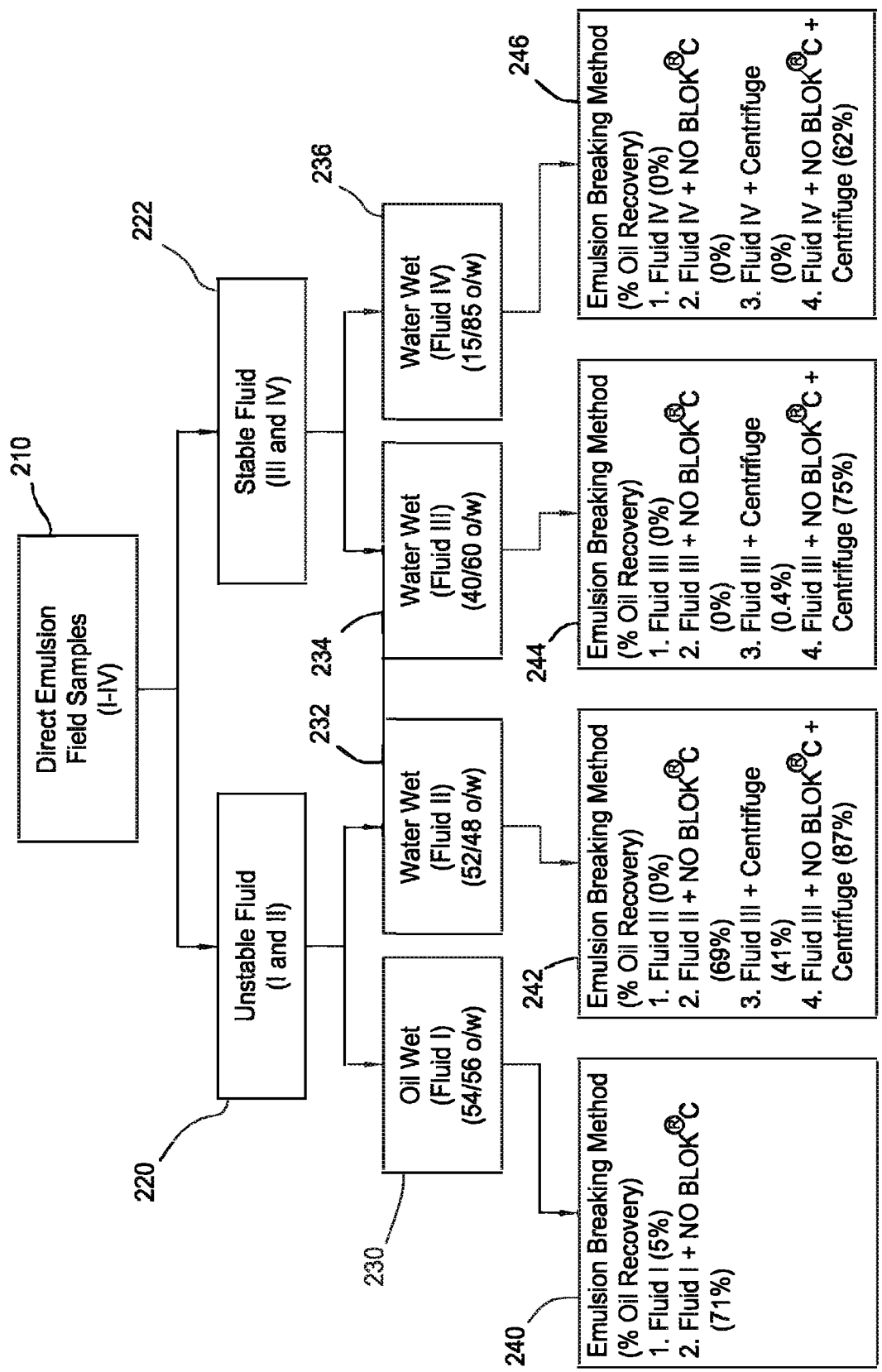
FIG. 2 is a schematic diagram illustrating oil recovery results obtained for the emulsion breaking of field mud samples in accordance with certain embodiments of the present disclosure.

In this example, oil recovery tests were performed for emulsion breaking of oil-in-water emulsion field mud samples using various methods. As shown in FIG. 2, oil recovery results were obtained for the emulsion breaking of four different field muds 210 (Fluids 1-IV) using different emulsion breaking methods. The emulsion breaker of this example was a quaternary ammonium compound in isopropyl alcohol solvent (NO BLOK® C, available from Halliburton Energy Services, Inc.). The field mud samples 210 (Fluids I-IV) were categorized as either unstable emulsions 220 or stable emulsions 222. The fluids were considered stable emulsions if no fluid separation (i.e., no separated brine or oil) was observed and unstable emulsions if fluid separation was observed. Fluid I 230 and Fluid II 232 were unstable emulsions and Fluid III 234 and Fluid IV 236 were stable emulsions.

Prior to emulsion breaking, fluid properties such as wettability and the oil-water ratio were acquired for each fluid. Wettability was determined using an electrical stability wettability test. The oil-water ratio was determined using the retort method, i.e., by vaporizing and separating the fluids, and then condensing each phase. The oil/water content for Fluids I-IV are listed in elements 230, 232, 234, and 236 of FIG. 2 in percent by volume. Of the unstable emulsions, Fluid I 230 was oil wet and Fluid II 232 was water wet. Both of the stable emulsions (Fluid III 234 and Fluid IV 236) were water wet.

As shown in elements 240, 242, 244, and 246 of FIG. 2, up to four chemical and mechanical emulsion breaking methods were tested for each fluid. Method 1 consisted of storing 20 ml of the fluid at room temperature for 16 hours. Method 2 consisted of adding sufficient NO BLOK® C to 20 ml of the fluid to reach a concentration of 2% NO BLOK® C by volume of the fluid, shaking the mixture by hand for 2 minutes, and then storing the mixture at room temperature for 16 hours. Method 3 consisted of centrifuging 20 ml of the fluid at 1,630 relative centrifugal force ("rcf" or "g") for 4 minutes and then storing the fluid at room temperature for 16 hours. Method 4 consisted of adding sufficient NO BLOK® C to 20 ml of the fluid to reach a concentration of 2% NO BLOK® C by volume of the fluid, shaking the mixture by hand for 2 minutes, centrifuging the mixture at 1,630 relative centrifugal force ("rcf" or "g") for 4 minutes, and then storing the mixture at room temperature for 16 hours. Fluid I was tested using methods 1 and 2, and Fluids II-IV were tested using all four methods. For each fluid and method tested, the volume of separated oil (VI) was measured and used to calculate the amount of separated oil in percent by volume according to equation (1):

$$\text{Amount of separated oil } (vol\ \%) = \frac{\text{oil volume}, V1}{20\ \text{ml of fluid}} \times 100 \quad (1)$$

The amount of separated oil was then used to calculate oil recovery:

$$\text{Percent Oil Recovery} = \frac{\text{Amount of separated oil } (vol\ \%)}{\text{emulsion oil content} (vol\ \%)} \times 100 \quad (2)$$

The percent oil recovery for each emulsion breaking test is shown in elements 240, 242, 244, and 246 of FIG. 2.

As shown, for the water wet samples (Fluids II, III, and IV), method 4—the addition of NO BLOK® C (2 vol %) followed by centrifuging (1630× g, 4 min) at ambient temperature-resulted in the highest overall oil recovery. On the other hand, for the oil wet sample, the use of NO BLOK® C (2 vol %) alone was sufficient to break the emulsion.

Example 2

In this example, emulsion break feasibility testing was performed on the additives listed in Table 1. Of these additives, NO BLOK® C, DEEP TREAT™, CFS™-461, and CFS™-684 are available from Halliburton Energy Services, Inc.; Radiagreen MBKC-3 and Radiagreen MBKC-4 are available from Oleon NV; and Silbreak™ is available from Momentive Performance Materials Inc. Each additive was tested by adding a sufficient amount of the additive to a stable oil-in-water emulsion field mud to reach a concentration of 2% of the surfactant by volume of the fluid, shaking the mixture and then storing it at room temperature for 16 hours. The percentage of oil recovered for each test was calculated using equations (1) and (2) based on the measured separated oil volume. The percent oil recovery for each emulsion breaker is provided below in Table 1.

TABLE 1

Percent Oil Recovery for Tested Additives at 2% by Volume

| Additive | Composition | Percent Oil Recovery |
| --- | --- | --- |
| NO BLOK ® C | Quaternary ammonium Compounds with isopropyl alcohol solvent | ~69% oil recovery |
| CFS ™-461 | Demulsifier/wetting agent | <20% oil recovery |
| DEEP TREAT ™ | Dodecylbenzene sulfonate and sodium salt | No oil recovery |
| Radiagreen ™ MBKC-3 | Fatty esters | No oil recovery |
| Radiagreen ™ MBKC-4 | Fatty esters | No oil recovery |
| CFS ™-684 | Demulsifier/wetting agent | No oil recovery |
| Silbreak ™ 327 | Silicone-based demulsifier | No oil recovery |

As shown in Table 1, NO BLOK® C provided the highest oil recovery and was the most effective emulsion breaker. Similar tests were performed for the compositions in Table 1 at concentrations of 1, 3, 4, and 5% by volume of the oil-in-water emulsion, and NO BLOK® C provided the highest oil recovery at all concentrations.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently. "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a quaternary ammonium compound into an oil-in-water emulsion treatment fluid that comprises an oleaginous phase and an aqueous phase, wherein the quaternary ammonium has a formula of R1R2R3R4N+, wherein at least one of R1, R2, or R3 comprises a heteroatom, at least one of R1, R2, or R3 is a C1 to C10 hydrocarbon chain, at least one of R1, R2, or R3 comprises a C1 to C10 hydrocarbyl group, and R4 comprises a C1 to C18 alkyl chain;
   introducing a brine into the oil-in-water emulsion treatment fluid;
   heating the oil-in-water emulsion treatment fluid to at least 80° F.;
   centrifuging at least the portion of the oil-in-water emulsion treatment fluid containing the quaternary ammonium compound to separate at least the portion of the oil-in-water emulsion treatment fluid into an oleaginous fluid and an aqueous fluid;
   preparing a recycled treatment fluid comprising at least a portion of the oleaginous fluid or the aqueous fluid or both; and
   introducing the recycled treatment fluid into the drill string and further extending the wellbore through subterranean formation.

2. The method of claim 1, wherein the brine is a saturated monovalent brine.

3. The method of claim 1, wherein the quaternary ammonium compound is mixed with a solvent prior to introduction into the oil-in-water emulsion treatment fluid.

4. A method comprising:
   introducing a quaternary ammonium compound into an oil-in-water emulsion treatment fluid that comprises an oleaginous phase and an aqueous phase, wherein the quaternary ammonium has a formula of R1R2R3R4N+, wherein at least one of R1, R2, or R3 comprises a heteroatom, at least one of R1, R2, or R3 is a C1 to C10 hydrocarbon chain, at least one of R1, R2, or R3 comprises a C1 to C10 hydrocarbyl group, and R4 comprises a C1 to C18 alkyl chain;
   introducing a brine into the oil-in-water emulsion treatment fluid;
   centrifuging at least the portion of the oil-in-water emulsion treatment fluid containing the quaternary ammonium compound to separate at least the portion of the oil-in-water emulsion treatment fluid into an oleaginous fluid and an aqueous fluid;

preparing a recycled treatment fluid comprising at least a portion of the oleaginous fluid or the aqueous fluid or both; and introducing the recycled treatment fluid into the drill string and further extending the wellbore through subterranean formation.

5. The method of claim 4, wherein the brine is a saturated monovalent brine.

6. The method of claim 4, wherein the quaternary ammonium compound is mixed with a solvent prior to introduction into the oil-in-water emulsion treatment fluid.

7. The method of claim 4, wherein the quaternary ammonium compound is non-polymeric.

8. The method of claim 4, wherein the oil-in-water emulsion treatment fluid is a water-based mud.

9. The method of claim 4, wherein the quaternary ammonium compound comprises a fatty carboxylic acid chain.

10. The method of claim 4, further comprising, before the step of centrifuging, mixing the quaternary ammonium compound and the oil-in-water emulsion treatment fluid to allow the oil-in-water emulsion treatment fluid to at least partially separate.

11. The method of claim 4, wherein the oleaginous fluid comprises at least 40% of the oleaginous phase of the oil-in-water emulsion treatment fluid by volume.

12. The method of claim 4, wherein the centrifuging is performed at a well site.

\* \* \* \* \*